Nov. 7, 1961 T. B. DALTON 3,007,677
LANDING GEAR FOR SEMI-TRAILERS AND THE LIKE
Filed Sept. 21, 1959 4 Sheets-Sheet 1

INVENTOR.
THOMAS B. DALTON
BY
Barnes, Kisselle, Raisch & Choate
ATTORNEYS

Nov. 7, 1961     T. B. DALTON     3,007,677
LANDING GEAR FOR SEMI-TRAILERS AND THE LIKE
Filed Sept. 21, 1959     4 Sheets-Sheet 2
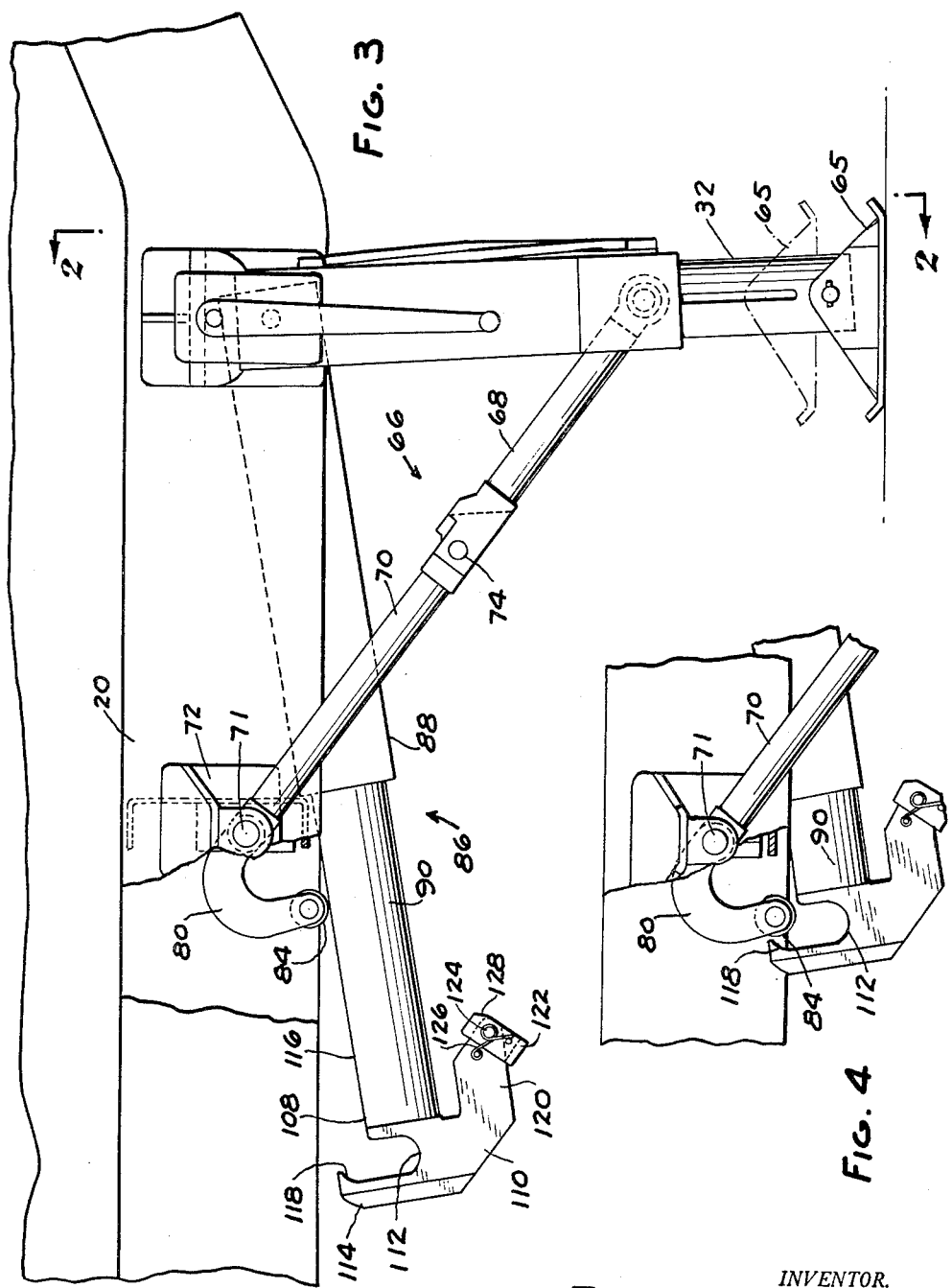
INVENTOR.
THOMAS B. DALTON
BY
Barnes, Kisselle, Raisch & Choate
ATTORNEYS Nov. 7, 1961 T. B. DALTON 3,007,677
LANDING GEAR FOR SEMI-TRAILERS AND THE LIKE
Filed Sept. 21, 1959 4 Sheets-Sheet 3
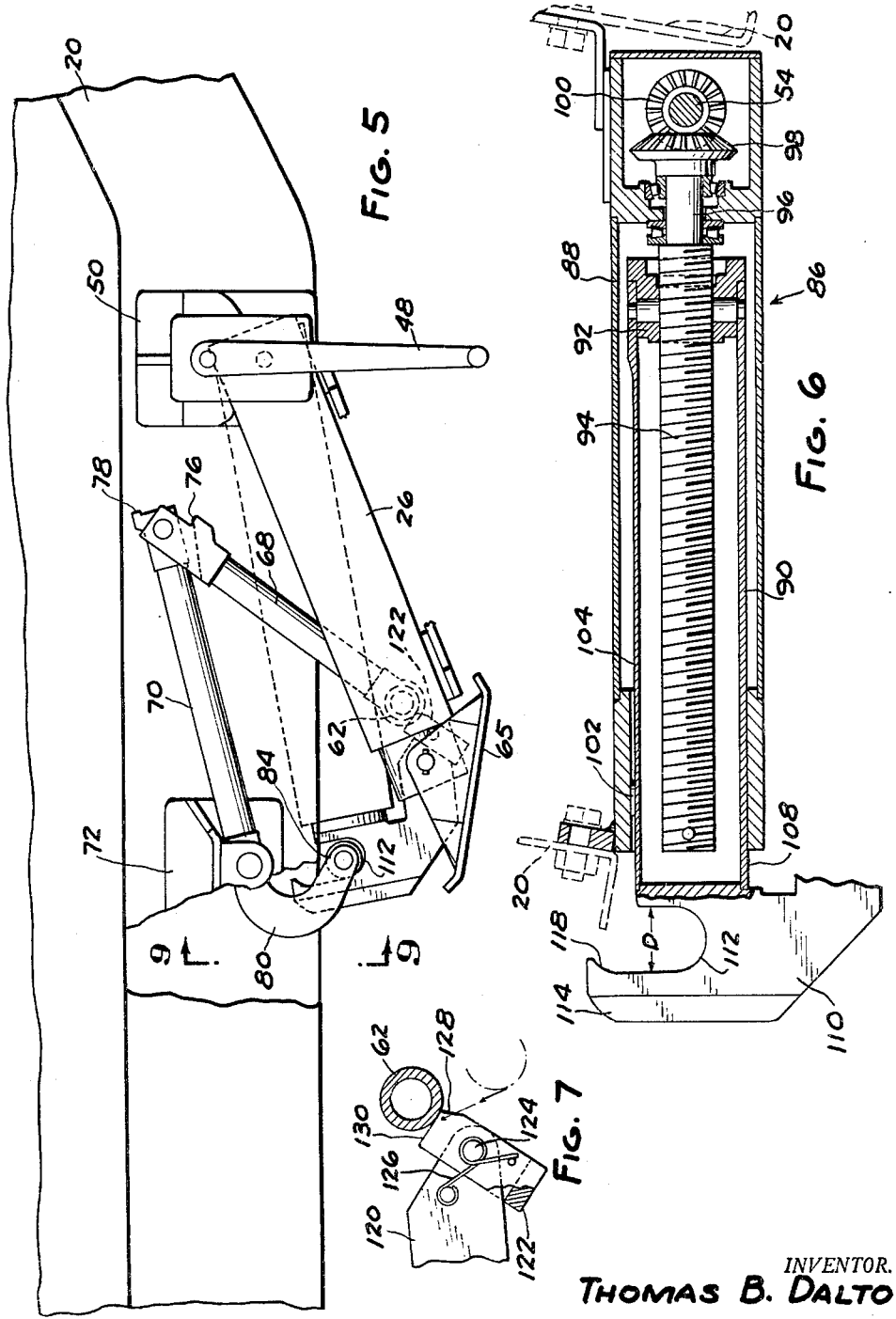
INVENTOR.
THOMAS B. DALTON
BY
ATTORNEYS

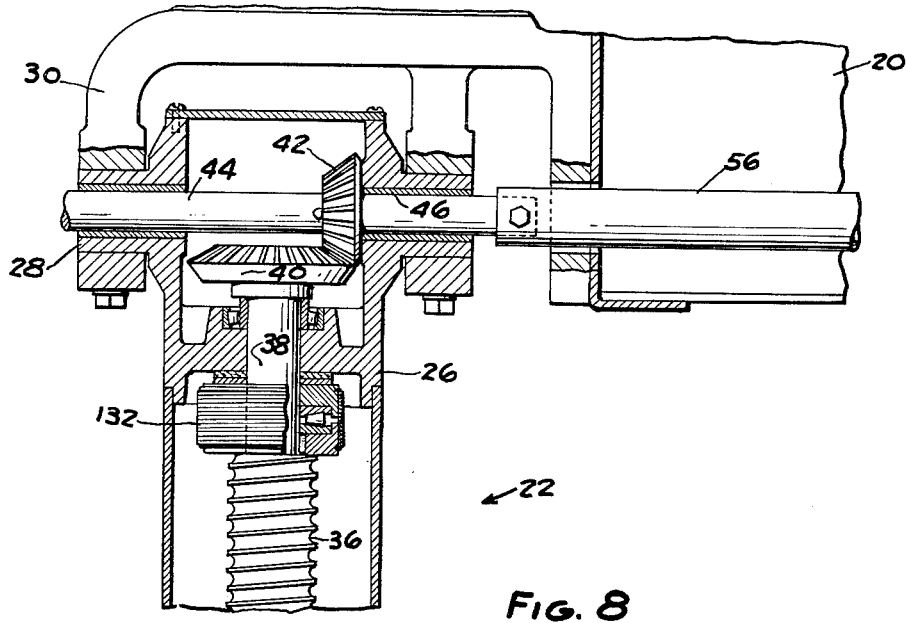
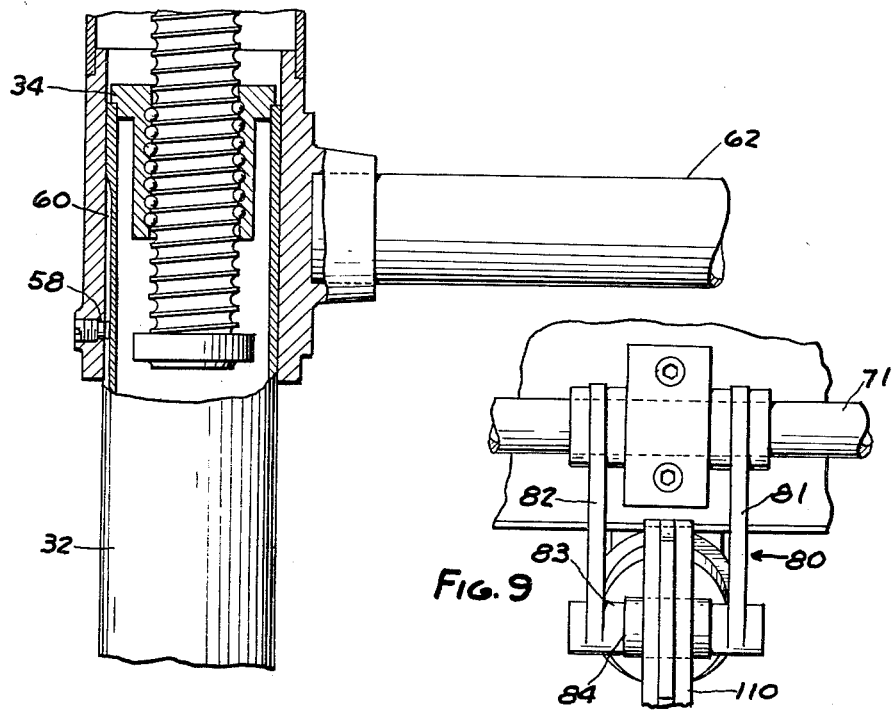

United States Patent Office 3,007,677
Patented Nov. 7, 1961

3,007,677
LANDING GEAR FOR SEMI-TRAILERS
AND THE LIKE
Thomas B. Dalton, Muskegon, Mich., assignor to West
Michigan Steel Foundry Co., Muskegon, Mich., a corporation of Michigan
Filed Sept. 21, 1959, Ser. No. 841,268
12 Claims. (Cl. 254—86)

This invention relates particularly to landing gear having legs pivotally mounted on the trailer frame for swinging to a vertical load supporting position and an upward retracted position. The legs are extensible in their vertical position for engagement with the ground and are shortenable to facilitate their upward swinging movement.

Prior landing gear structures have required the operator to perform a succession of operations in raising and lowering the gear and locking it in its various positions. An object of this invention is to provide a relatively simple, inexpensive landing gear structure improved so that all the operator need do is turn a handle to shift the landing gear from one position to another. The swinging of the legs, extending or shortening thereof, and unlocking and locking the gear in its various positions is automatic.

The invention is carried out generally by providing an extensible arm for folding and unfolding the leg struts to raise and lower the legs. The arm is operated by the mechanism which extends or shortens the legs in their vertical position. The arm includes means in its shortened condition to lock the legs in their upward retracted position and includes means in its extended condition to lock the legs downwardly. In an intermediate range of movement of the arm, the struts are held unfolded so that the legs can be extended and shortened while remaining in their downward vertical position. One form of the invention is illustrated in the accompanying drawings.

FIG. 3 is a side elevational view of the landing gear in trailer supporting position.

FIG. 4 is a fragmentary elevational view illustrating parts in an intermediate position.

FIG. 5 is an elevational view illustrating the landing gear in upward retracted position.

FIG. 6 is an enlarged sectional view on line 6—6 of FIG. 2.

FIG. 7 is an enlarged framentary partly diagrammatic view of a lock supporting the landing gear in retracted position.

FIG. 8 is an enlarged fragmentary generally sectional view illustrating the extensible leg structure.

FIG. 9 is a fragmentary front elevation of a part of the structure.

Figure 1:
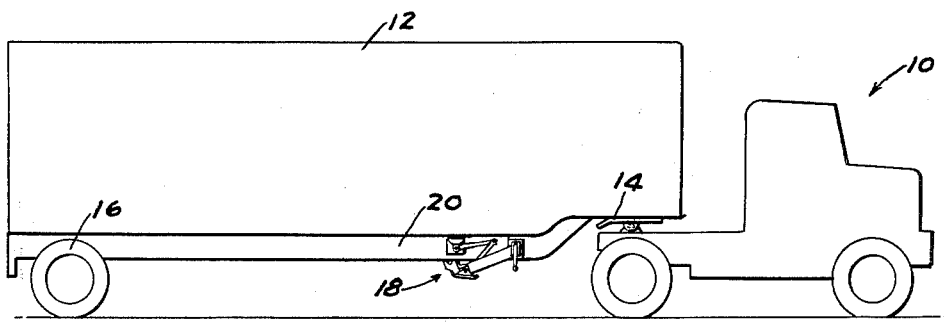
FIG. 1 is a generally diagrammatic elevational view of a tractor and semi-trailer utilizing the landing gear of this invention.

Shown in the drawings is a tractor 10 coupled to a semi-trailer 12 through a conventional detachable fifth wheel structure 14. The rear of the semi-trailer is supported by ground engaging wheels 16 and landing gear 18, according to this invention, is secured to a forward portion of frame 20 of the trailer.

The landing gear includes two load supporting legs 22 and 24 identically constructed except for having right and left hand relation. Each leg has an upper portion 26 pivotally journalled as at 28 (FIG. 8) on a bracket 30 anchored on trailer frame 20. Each leg includes a slidable telescoping extension 32 secured to a nut 34 engaged with a circulating ball type screw 36 having a shaft extension 38 terminating in a beveled gear 40. The screw is journalled in the upper housing portion 26 of the leg as illustrated and is operated by a beveled gear 42 on a shaft 44 journalled in leg portion 26 and bracket 30 through a bearing 46. Shafts 44 are rotated by an operating handle 48 through a conventional two-speed gear box 50 and interposed shafting. The shafting for leg 22 includes members 52, 54 and 56. Upon turning handle 48, screw 36 of each leg is turned to raise or lower nut 34 and leg extension 32. The leg extensions are secured against rotation by keys 58 engaging within key slots 60 as illustrated in FIG. 8. Legs 22 and 24 are secured together to swing as a unit by a cross shaft 62 and angled bracing 64. Leg extensions 32 have ground engaging shoes 65 at their lower ends.

A pair of struts 66 is provided for securing legs 22 and 24 in their vertical downward position and for swinging the legs to their upper retracted position. For this purpose, each strut has a lower member or link 68 pivoted on shaft 62 and an upper member or link 70 fastened on a transverse shaft 71 journalled on brackets 72 anchored to frame 20. Members 68 and 70 are pivotally secured to each other as at 74 so that the struts can be folded. Strut members 68 and 70 are provided with shoulders 76 and 78 which interengage when the strut members are in mutual extension to provide a rigid strut structure. A U-shaped lever 80 is fastened to shaft 71 for rotation therewith. Lever 80 includes two spaced apart members 81 and 82 supporting a shaft 83 in turn supporting a roller 84 engageable with an actuating device 86 for swinging the legs to their upward and downward positions and locking the legs in those positions.

Device 86 comprises a telescopingly extensible arm having an outer member 88 anchored to frame 20 (FIG. 6) and an inner member 90 with a nut 92 pinned thereto adjacent one end and engaged with an Acme type screw with a shaft extension 96 journalled on the outer member and terminating in a beveled gear 98 operably engaged with a beveled gear 100 on shaft 54 which is turned by means of operating handle 48 as described above. Inner arm member 90 is secured against rotation by a key 102 on the outer member engaged in a keyway 104 on the inner member.

The outer end portion 108 of arm member 90 carries a plate 110 having a recessed hook conformation 112 which continues in a projection 114 extending above the top surface 116 of arm member 90 and terminates in an inwardly turned cam portion 118 positioned for engaging roller 84. Hook 118 has a width D (FIG. 6) greater than the diameter of roller 84 for a purpose to be described. Top surface 116 of arm 90 is relatively level or even in the direction of travel of the arm and is engaged by roller 84 in the downward position of legs 22 and 24. Plate 110 has a portion 120 disposed below arm member 90 and projecting toward legs 22 and 24. At the end of this projection a locking latch member 122 is pivoted as at 124 and a spring 126 biases the latch to the position illustrated in FIG. 3. The latch has a cam surface 128 and a locking surface 130 engageable with shaft 62 for a purpose to be described.

Figure 2:
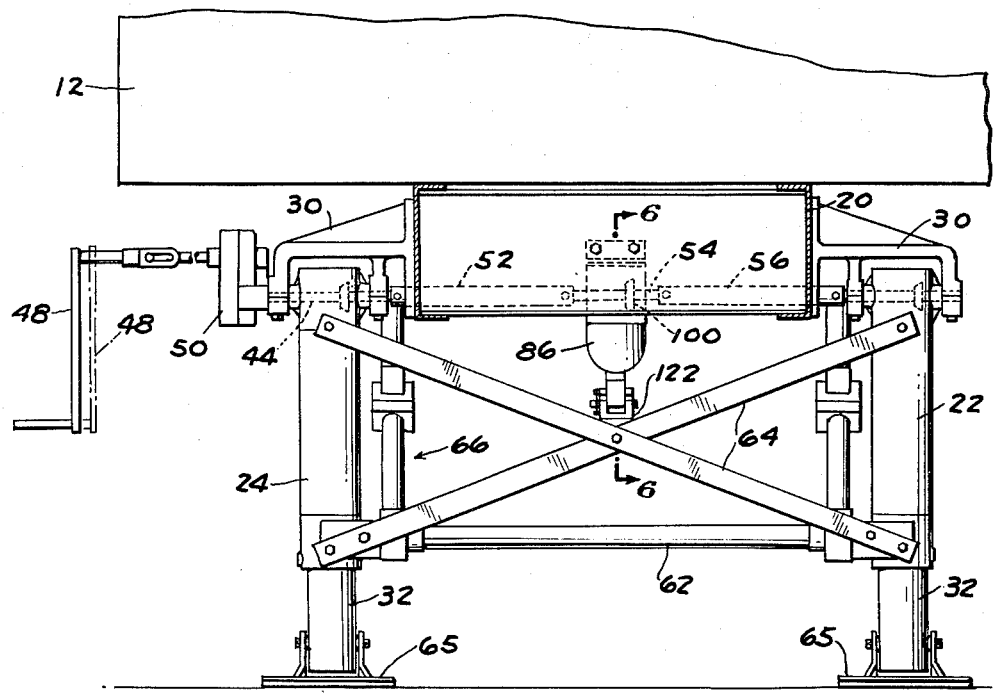
FIG. 2 is a rear elevational view of the landing gear in trailer supporting position.

In use it may be assumed that the landing gear initially is in the position illustrated in FIGS. 2 and 3 wherein legs 22 and 24 are swung downwardly to their generally vertical position and are extended so that shoes 65 at their lower ends are engaged against the ground for supporting the front end of trailer 12. Strut members 68 and 70 are in mutual extension with shoulders 76 and 78 thereon interengaged to prevent the strut members from folding downwardly about pivot 74. Arm member 90 is extended relative to outer arm member 88. Roller 84 on lever 80 is engaged against the top surface 116 of arm member 90. Since strut member 70 and hook 80 are both fastened to shaft 71, strut member 70 is prevented from swinging counter-clockwise as FIG. 3 is viewed by interengagement of roller 84 and surface 116. Strut 66 is thereby maintained in rigid condition for supporting legs 22 and 24 in their downward position.

To retract the landing gear, operating handle 48 is turned to rotate shafts 44 and shafting 52, 54 and 56. This simultaneously turns beveled gears 42 and 100 which in turn operate screws 36 in legs 22 and 24 and screw 94 in arm 90. Screws 36 retract leg members 32 upwardly and at the same time screw 94 retracts arm member 90 inwardly. During this movement roller 84 rolls on surface 116 until shoes 65 are elevated to the approximate position illustrated in broken lines in FIG. 3. During this time, strut 66 is held rigid by engagement of roller 84 and surface 116.

Upon continued turning of the operating handle, arm member 90 continues to retract until roller 84 rolls off of the end of the surface 116. Then cam 118 engages roller 84 and moves it downwardly into hook or recess 112. This breaks the joint between strut members 68 and 70. Upon continued inward movement of arm member 90, roller 84 is forced in a counter-clockwise direction around the axis of shaft 71 to rotate the shaft and strut member 70. This movement and the retracting movement of leg members 32 continues until the landing gear has been retracted and folded to the condition illustrated in FIG. 5.

In the meantime, when shaft 62 reaches a point near the upper end of its swinging path it engages surface 128 on latch member 122 and swings the latch member to one side against the action of spring 126. When shaft 62 passes surface 128, spring 126 snaps the latch member to the position illustrated in FIG. 7 wherein surface 130 engages beneath shaft 62. This provides a positive lock for retaining the landing gear in its upward position and also supplements the support for the landing gear in its upward position provided by engagement of roller 84 within hook 112. One advantage of this arrangement is to relieve torsional force within the folded strut structure and hook 80 when trailer 12 passes over rough roads or uneven ground.

Thus the landing gear is moved from its locked-down position to its locked-up position by merely turning handle 48.

To lower the landing gear handle 48 is merely turned in the opposite direction. This operates screws 36 and 94 to extend legs 22 and 24 and extend arm member 90 out of arm member 88. In the initial outward movement of arm member 90, hook 112 moves independently of roller 84 since the hook has a greater width dimension than the diameter of the roller and since latch 122 holds the folded gear stationary. This lost motion carries latch 122 out from under shaft 62 so that the legs are freed to swing. Upon continued outward movement of hook 112, lever 80 and upper strut member 70 are rotated clockwise as FIGS. 3 and 5 are viewed until roller 84 is positioned for engaging top surface 116 of arm member 90 at which time the strut members have been unfolded into a condition of mutual extension with their shoulders 76 and 78 abutting. During this movement, leg members 32 have been projected out of leg members 26 and have again reached the point illustrated by the dotted line position of shoes 65 in FIG. 3.

When the operating handle is turned further, shoes 65 move downwardly into ground engaging position and during this movement the struts are held rigid by rolling engagement of roller 84 on top surface 116 or arm member 90.

Thus the landing gear is shifted from its locked-up position to its locked-down position by merely turning handle 48.

As illustrated in FIG. 2, operating handle has two positions for shifting gear box 50 to either a high-ratio or low-ratio gearing. This is conventional. The landing gear may be raised and lowered at high gear ratio. To raise the front end of trailer 12 it is usually advantageous to utilize the lower gear ratio.

The use of ball type screws in legs 22 and 24 is advantageous to minimize the amount of effort required of the operator to elevate the front end of trailer 12, particularly when loaded. However, means must be provided for preventing the trailer load from running the ball type screws retrograde and for this purpose an Acme type screw is preferably used in arm 86. This screw has sufficient frictional resistance to operation to provide significant resistance to retrograde operating of the ball type screws in the legs. In addition, a conventional helical coil type brake or clutch 132 (see Dalton 2,655,340) is mounted on each ball screw 36 arranged to release to facilitate elevating the trailer and arranged to engage upon reversal of torque to resist retrograde screw movement.

It has been found that in ordinary landing gear leg construction it is very difficult to provide brake structures adequate of themselves to prevent retrograde screw movement because of the heavy loads involved and the high efficiency of the ball screws. However, these brakes in conjunction with the Acme screw of arm 86 adequately restrain retrograde screw movement. Frictional resistance of the Acme screw to turning is also sufficient to hold the landing gear in positions intermediate its locked-up and locked-down positons so that if desired a raising or lowering operation may be interrupted without the gear moving gravitationally downward.

I claim:

1. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, mechanism secured to said leg means and adapted to be secured on the trailer, other means adapted to be secured on the trailer, said other means being extensible and shortenable by said operating means, means operably interposed between said other means and mechanism and being operable responsive to extending and shortening of said other means in a range of movement to actuate said mechanism for swinging said leg means selectively to said vertical and retracted positions, said operable means being operably disconnectable responsive to movement of said other means beyond said range so that said leg means can be extended and shortened while in said vertical position thereof.

2. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, mechanism secured to said leg means and being adapted to be secured on the trailer, an element adapted to be secured on the trailer and being operably connected to said operating means for movement relative to said mechanism, said element having first and second portions engageable with means included in said mechanism, said first portion and said means in said mechanism being interengaged in a range of movement of said element and cooperating responsive to movement of said element in said range of movement to actuate said mechanism for swinging said leg means selectively to said vertical and retracted positions, said first portion disengaging said means in said mechanism and said second portion engaging the latter said means responsive to movement of said element in another range beyond said range of movement, said second portion and the latter said means cooperating in said other range of movement of said element to secure said mechanism in a condition for holding said leg means in said vertical position so that said leg means can be extended and shortened while in said vertical position thereof.

3. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, foldable linkage secured to said leg means and being adapted to be secured to the trailer, means forming a lever member operably connected to said linkage, said linkage in unfolded condition providing a strut securing said leg means in said vertical position, said leg means being retractable to said upward position responsive to folding of said linkage, an element adapted to be secured on said trailer and being operably connected to said operating means for movement relative to said lever member, said element having first and second portions engageable with said lever member, said first portion and lever member being interengaged in a range of movement of said element and co-operating responsive to movement of said element in said range to swing said leg means selectively to said vertical and retracted positions, said first portion being disengageable from said lever member and said second portion being engageable with said lever member responsive to movement of said element in another range beyond said range of movement, said second portion and lever member co-operating in said other range of movement of said element to secure said linkage in unfolded condition for holding said leg means in vertical position so that said leg means can be extended and shortened while in said vertical position thereof.

4. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, foldable linkage secured to said leg means and being adapted to be secured to the trailer, means forming a lever member operably connected to said linkage, said linkage in unfolded condition providing a strut securing said leg means in said vertical position, said leg means being retractable to said upward position responsive to folding of said linkage, an element adapted to be secured on said trailer and being operably connected to said operating means for movement relative to said lever member, means defining a hook on said element and means defining an even surface on said element which is generally uniform in the direction of travel of said element, said hook being engageable with said lever member in a range of movement of said element and said hook and lever member co-operating in said range of movement to swing said leg means selectively to said vertical and retracted positions, said hook being disengageable from said lever member and said even surface being engageable with said lever member responsive to movement of said element beyond said range, said element and lever member co-operating when said surface is engaged against said member in said movement thereof beyond said range to secure said linkage in unfolded condition for holding said leg means in vertical position so that said leg means can be extended and shortened while in said vertical position thereof.

5. The combination defined in claim 4 wherein said hook includes a cam portion aligned with a portion of said lever member when the latter is engaged against said surface, said cam portion being operative to force said lever into engagement within said hook responsive to movement of said element when it enters said range of movement.

6. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, a pair of links pivoted to each other, one link being pivoted on said leg means and the other link being adapted to be pivoted on the trailer, a lever operably connected to said other link and being operable to fold and unfold said links for swinging said leg means to said vertical and retracted positions, said links in unfolded condition forming a strut securing said leg means in said vertical position, a telescopingly extensible and shortenable element operable by said operating means, said element being adapted to be secured on the trailer so that it can be extended and shortened in a direction toward and away from the mounting of said leg means, said element having a generally even surface in its direction of travel terminating adjacent a recessed hook, said hook including a cam portion projecting above said surface, said lever member having a portion engaging said surface in extended condition of said element and said element and lever member co-operating to secure said links in unfolded condition for holding said leg means in said vertical position, said lever member riding on said surface when said operating means is operated to shorten said leg means in vertical position, said cam portion engaging said lever member responsive to shortening of said element and said leg means a predetermined extent, said cam portion being operable to force said lever member into said hook responsive to continued shortening of said element and leg means, said hook and lever member being co-operable upon continued shortening of said element to fold said links and swing said leg means to said upward retracted position.

7. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, foldable linkage secured to said leg means and being adapted to be secured to the trailer, a lever member operably connected to said linkage, an element adapted to be secured to said trailer and being operably connected to said operating means for movement relative to said lever member, means defining a hook on said element and means defining a surface on said element which is generally even in the direction of movement of said element, said lever member and surface being interengaged in one position of said element for securing said linkage in unfolded condition to hold said leg means in vertical position, said even surface having an extent such that said lever member is engaged therewith through a range of movement in which the leg means is partially shortened by said operating means, said lever member and hook being interengageable beyond said range of movement and co-operating to fold said linkage for swinging said leg means upwardly, means on said element and leg means interengageable at a location adjacent the uppermost end of the swinging path of said leg means, said interengageable means co-operating when interengaged to form a load bearing connection through which weight of said leg means is supported by said means on said element, and a lost motion connection between said hook and lever member facilitating initial leg-lowering movement of said element independent of said lever member, said load bearing connection being releasable responsive to said independent movement of said element, whereby to release said leg means for swinging to said vertical position.

8. The combination defined in claim 7 wherein said interengageable means comprises a latch member pivotally mounted on one of the parts defined as said element and said leg means and being deflectable upon engagement with the other of said parts so that said latch member can pass a portion of said other part, and spring means biased to snap said latch member into load bearing relation against said other part after said latch member has passed said portion thereof.

9. The combination defined in claim 8 wherein said latch member is carried by a projection on said element extending below said hook and surface.

10. Landing gear for a semi-trailer or the like comprising, extensible leg means adapted to be mounted on the trailer for swinging to a generally vertical trailer supporting position and an upward retracted position, operating means operable to extend and shorten said leg means in said vertical position, foldable linkage secured to said leg means and being adapted to be secured to the trailer, other means adapted to be secured on the trailer, said other means being extensible and shortenable by said operating means, said other means and linkage including means co-operating responsive to extending and shortening of said other means to unfold and fold said linkage for swinging said leg means to said vertical and retracted positions, means providing a connection between said linkage and said other means securing said linkage in fully unfolded condition in a range of movement and thereby facilitating vertical extension and shortening of said leg means with said linkage in fully unfolded condition, said leg means and other means having means interengageable at a location adjacent the uppermost end of the swinging path of said leg means, said interengageable means co-operating when interengaged to form a load bearing connection through which weight of said leg means is supported by said other means, said other means being movable independently of said leg means in the initial leg-lowering movement of said other means, said load bearing connection being releasable responsive to said independent movement whereby to release said leg means for swinging to said vertical position.

11. In landing gear for a semi-trailer or the like having extensible leg means adapted to be mounted on the trailer for swinging to a generally vertical trailer-supporting position and an upward retracted position, the improvement which comprises the combination of ball screw means operable to extend and shorten said leg means, operating means for the ball screw means, an extensible and shortenable arm adapted to be mounted on the trailer, mechanism actuated by said arm for swinging said leg means, screw and nut means having slidably interengaged threads and being operable to extend and shorten said arm, said screw and nut means being operably connected to said operating means for said ball screw means, so that frictional resistance to relative movement of said interengaging threads resists operation of said ball screw means.

12. In combination with the structure defined in claim 11 brake means operably connected with said ball screw means and operating means, said brake means being releasable responsive to operation of said operating means and being engageable responsive to load induced torque for resisting retrograde movement of said ball screw means, said frictional resistance of said interengaged threads and the braking force of said brake means being complemental for preventing retrograde load induced operation of said ball screw means.

References Cited in the file of this patent

UNITED STATES PATENTS

| | | |
|---|---|---|
| 1,890,972 | Davis | Dec. 13, 1932 |
| 2,008,948 | Edwards | July 23, 1935 |
| 2,191,866 | Seyferth | Feb. 27, 1940 |
| 2,431,245 | Haig et al. | Nov. 18, 1947 |
| 2,882,070 | Bill | Apr. 14, 1959 |

FOREIGN PATENTS

| | | |
|---|---|---|
| 796,938 | Great Britain | June 25, 1958 |